United States Patent
Dinter et al.

(10) Patent No.: US 7,331,028 B2
(45) Date of Patent: Feb. 12, 2008

(54) ENGINEERING CHANGE ORDER SCENARIO MANAGER

(75) Inventors: Matthias Dinter, Holzkirchen (DE); Juergen Dirks, Holzkirchen (DE); Herbert Johannes Preuthen, Groebenzell (DE)

(73) Assignee: LSI Logic Corporation, Milpitas, CA (US)

( * ) Notice: Subject to any disclaimer, the term of this patent is extended or adjusted under 35 U.S.C. 154(b) by 216 days.

(21) Appl. No.: 10/902,987

(22) Filed: Jul. 30, 2004

(65) Prior Publication Data
US 2006/0026546 A1    Feb. 2, 2006

(51) Int. Cl.
G06F 17/50    (2006.01)
G06F 9/455    (2006.01)
G06F 9/45     (2006.01)

(52) U.S. Cl. .................. 716/11; 716/5; 716/10
(58) Field of Classification Search .......... 716/4, 716/6, 11, 8, 5, 10
See application file for complete search history.

(56) References Cited

U.S. PATENT DOCUMENTS

| | | | |
|---|---|---|---|
| 5,764,525 A * | 6/1998 | Mahmood et al. | 716/18 |
| 6,272,665 B1 * | 8/2001 | Johnson et al. | 716/3 |
| 6,272,668 B1 * | 8/2001 | Teene | 716/10 |
| 6,530,073 B2 * | 3/2003 | Morgan | 716/18 |
| 2002/0129325 A1 * | 9/2002 | Tanaka | 716/11 |
| 2004/0098382 A1 * | 5/2004 | Chuang et al. | 707/3 |
| 2004/0139410 A1 * | 7/2004 | Ghameshlu et al. | 716/6 |
| 2004/0193602 A1 * | 9/2004 | Liu et al. | 707/9 |
| 2005/0034091 A1 * | 2/2005 | Harn | 716/6 |
| 2005/0080502 A1 * | 4/2005 | Chernyak et al. | 700/97 |
| 2005/0132309 A1 * | 6/2005 | Saxena et al. | 716/4 |
| 2005/0235234 A1 * | 10/2005 | Lakshmanan et al. | 716/4 |
| 2006/0030965 A1 * | 2/2006 | Williams et al. | 700/121 |
| 2006/0031796 A1 * | 2/2006 | Meaney | 716/6 |

\* cited by examiner

*Primary Examiner*—Jack Chiang
*Assistant Examiner*—Magid Y. Dimyan
(74) *Attorney, Agent, or Firm*—Christopher P. Maiorana PC

(57) ABSTRACT

A method and apparatus for managing a plurality of change orders for a circuit design is disclosed. The method generally includes the steps of (A) receiving the change orders generated manually by a user, (B) analyzing the circuit design with all of the change orders implemented and (C) generating a report suitable for the user to understand based on a result of the analyzing.

23 Claims, 4 Drawing Sheets

ENGINEERING CHANGE ORDER SCENARIO MANAGER

FIELD OF THE INVENTION

The present invention relates to application specific integrated circuit development generally and, more particularly, to an engineering change order scenario manager.

BACKGROUND OF THE INVENTION

A task difficult to plan during an implementation phase of an application specific integrated circuit (ASIC) or a Platform ASIC design task is an engineering change order (ECO) phase. The ECOs are the steps during which a design netlist is changed, new or existing cells are moved in a layout and routing is improved to fix remaining timing and signal integrity violations (i.e., hold time or crosstalk violations). The ECO phase starts after cell placement and a first run for detailed routing of the design.

In complex multi-million gate designs, a large number of ECOs can be created and each ECO can have a turn around time of up to one week. Therefore, a duration for the ECO phase of the design is difficult to predict and thus easily causes schedule slips if underestimated. Such schedule hits are not acceptable in a rapid development environment. The high number of ECOs is caused by a high complexity of the designs and the fact that while fixing one type of violation, another type of violation is not property taken into account. As a result, the fixes for different types of violations can influence each other. Thus, a high probability exists that a change initiated by an ECO is not good enough to fix certain violations or can even create new violations.

Referring to FIG. 1, an example block diagram of a circuit 10 illustrating a logic cone containing a common hold time violation is shown. The hold time violation at a "D" input of a flip-flop 12 is caused by a first starting point at a flip-flop 14. Hold time refers to an amount of time a signal is specified to remain valid after a clock edge used to sample the signal. When a clock signal (i.e., CP) transitions, a signal at the D input to flip-flop 12 changes too rapidly due to a changing output signal at a "Q" output of the flip-flop 14.

Some conventional tools try to fix the hold time violation at an endpoint of a logic cone 16, in particular, at the D input of the flip-flop 12. For example, some conventional tools fix the hold time violation by adding a delay cell (not shown) in a net (i.e., NETA). However, adding the delay cell in the NETA creates a setup time violation from a second starting point into the logic cone 16 at a flip-flop 18. Setup time refers to an amount of time a signal is specified to remain valid before a clock edge used to sample the signal. Other conventional tools calculate that the hold time violation at the D input of the flip-flop 12 can be fixed only from the starting point of the flip-flop 14 by introducing a new setup violation for the other starting point of the logic cone 16 at the flip-flop 18. As a result, the original hold time violation is not actually fixed at all. Adding a delay cell at another point in the logic cone 16 (i.e., NETB) would solve the problem.

A number of different tools are currently available to fix different types of timing and signal integrity violations. However, the tools either work independently or at least in separate steps from each other. In practice, the results from one conventional tool (or one step of a conventional tool) are not taken into account by the other conventional tools or steps. Furthermore, manually generated netlist changes have to be run through a placement and routing tools separately. The manually generated netlist changes cannot be evaluated in context with other ECOs or be compared with other ECOs. In addition, using different conventional tools means that different setups have to be provided meaning that a lot of experience is needed by the engineers.

SUMMARY OF THE INVENTION

The present invention concerns a method for managing a plurality of change orders for a circuit design. The method generally comprises the steps of (A) receiving the change orders generated manually by a user, (B) analyzing the circuit design with all of the change orders implemented and (C) generating a report suitable for the user to understand based on a result of the analyzing.

The objects, features and advantages of the present invention include providing a method and/or architecture for managing engineering change orders that may (i) reduce an overall number of ECOs used to finish a design, (ii) provide predictable schedules, (iii) be successfully implemented by less experienced engineers and/or (iv) be adaptable to a variety of design environments such as ASIC designs and/or Platform ASIC designs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 2:
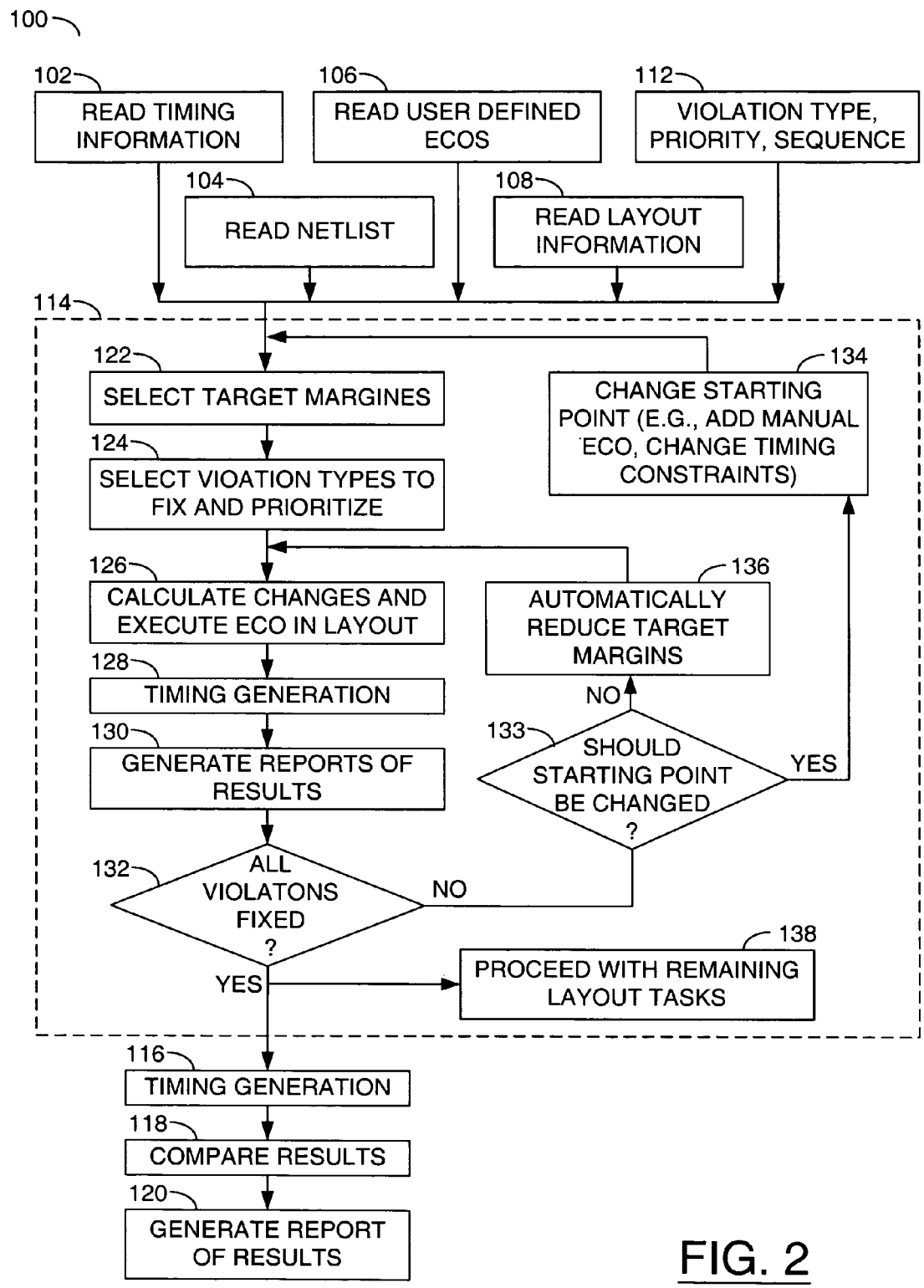
FIG. 2 is a flow diagram of an example implementation of a design tool in accordance with a preferred embodiment of the present invention.

The general purpose of the present invention is to shorten turn around times for engineering change orders (ECO) and to reduce a number of ECOs used to complete a design of an application specific integrated circuit (ASIC). Referring to FIG. 2, a flow diagram of an example implementation of a design tool (or method) 100 is shown in accordance with a preferred embodiment of the present invention. As an entry point, one or more timing reports for a circuit design under consideration and a netlist for the circuit design may be read into the design tool 100 (e.g., blocks 102 and 104). A capability to read manually generated ECOs, ECOs generated by other software tools and existing layout information into the design tool 100 may also be provided (e.g., blocks 106 and 108). Each of the blocks 102, 104, 106 and 108 may also be operational to change the entered information to one or more predetermined formats suitable for subsequent processing. The design tool 100 may also have a process (e.g., block 112) to read other user generated information, such as violations to be fixed, a sequence or order to implement the ECOs, priorities for when to apply each ECO, and/or designated margins.

For cases where a user wants to evaluate the quality of a manually generated change, the design tool 100 may provide a capability to read in and handle more than a single proposed set of changes, each set containing one or more ECOs. The design tool 100 may analyze (e.g., block 114) each proposed set of changes individually to produce several possible results, one result for each proposed change,. The results may be stored (e.g., block 116) for subsequent processing. The design tool 100 may be operational to perform an automated comparison (e.g., block 118), to find a best solution in terms of new timing and signal integrity results. A report of the results may be generated (e.g., block 120) in a format suitable for the user to read and understand.

The above operations may enable the user to evaluate certain scenarios that may lead to different results. For example, the user may specify different orders or priorities of violations to be fixed to determine an optimal fix to the known violations. The comparison operation 118 may also be configured to operate on the results from different scenarios to automatically evaluate a quality of each result in terms of timing (e.g., setup time, hold time, ramp up time, ramp down time, etc.) and/or signal integrity (e.g., crosstalk, noise, ground bounce, etc.).

The design tool 100 may allow the user to specify (e.g., block 112) minimum timing margins that should be maintained on already not-violated paths. The design tool 100 may also provide default target margins (e.g., block 122) for margins not specified by the user.

The design tool 100 may be operational to make direct use of existing layout information read through block 108. For example, implementation of ECOs may place new buffers and/or delay cells as well as possible onto an existing routing track. The results of the change may become much more predictable than with conventional tools. Existing routing may be reused, instead of having to start routing for changed nets from scratch, potentially resulting in shorter runtimes.

The design tool 100 may be operational to identify violations types to fix and an appropriate sequence to implement the changes (e.g., block 124). The sequence may be based on the priority and/or order entered by the user via block 112. After establishing the change sequence, the design tool 100 may calculate changes to the existing layouts caused by implementing the ECOs (e.g., block 126). An optional timing engine operation (e.g., block 128) may be included in the design tool 100 to calculate timing changes caused by the ECOs on-the-fly. Results of the changes may be integrated into one or more reports (e.g., block 130). The reports may be in a format readable and understandable by the user.

In one embodiment, the user may determine if violations still exist based on the reports (e.g., decision block 132). In another embodiment, the design tool 100 may determine if one or more violations remain after implementing all of the entered ECOs (e.g., block 132). If violations still exist (e.g., the NO branch of block 132), the design tool 100 should report the remaining violations with the reasons for not being able to fix the violations (e.g., conflicting constraints for setup times and hold times, constraints too tight to meet, layout too congested, etc.). The design tool 100 may give the user a choice to either (i) exit the process (e.g., the YES branch of decision block 133) and specify a new starting point, potentially including changed constraints and/or new manually generated ECOs (e.g., block 134) or (ii) automatically continue (e.g., the NO branch of decision block 133) by relaxing the default target margins (e.g., block 136). Margin relaxing may end with zero nanosecond margins for setup times, hold times or both.

In case the design tool 100 is allowed to continue automatically relaxing the target margins, the design tool 100 should do so by re-entering the loop of creating ECOs based on the new relaxed target margins into block 126. Otherwise, the user may modify the starting point (e.g., add manually generated ECOs, change existing ECOs and/or change timing constraints) and re-enter the loop at the beginning at block 122. The changes and subsequent evaluation of the results may be repeated until none, or until only a user acceptable number of violations remain (e.g., the YES branch of block 132). Thereafter, additional layout tasks may be performed on the modified circuit design (e.g., block 138).

For timing violations that cannot be fixed at the endpoint of a logic cone, the design tool 100 may include a capability to go backwards in the logic cone and identify an earlier net in the cone that would allow a fix for the timing violation without creating a new one. With the above approach for going backwards in a logic cone, fixing several violations may be simple if all of the violations may be caused by the same starting point. The single starting point fix may be applied even where the violations are at different ending points.

Figure 3:
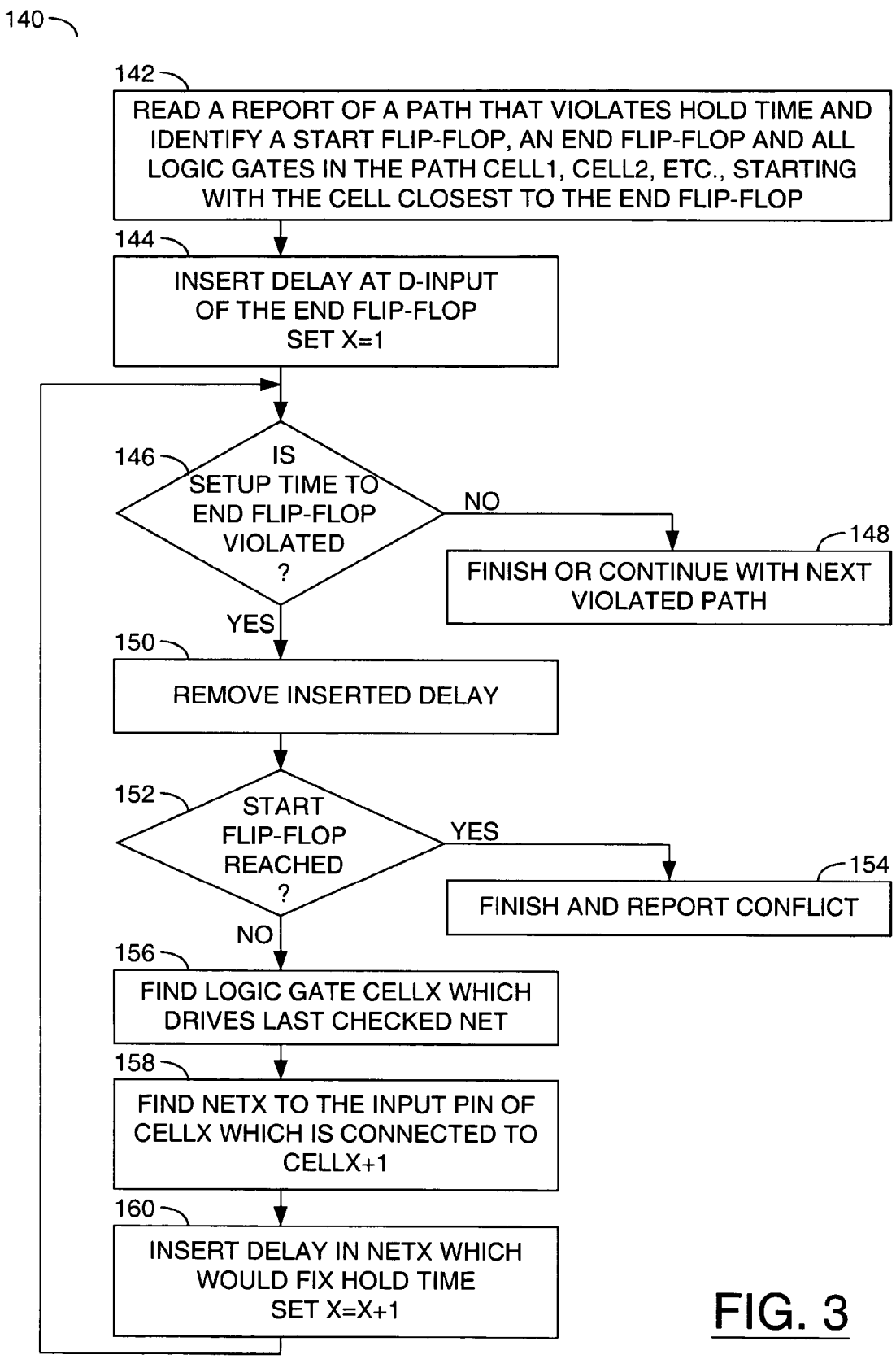
FIG. 3 is a flow diagram of an example method for working backwards in a logic cone.

Referring to FIG. 3, a flow diagram of an example method 140 for working backwards in a logic cone is shown. The design tool 100 generally starts with reading a timing report containing a hold time violation (e.g., block 142). The design tool 100 may then identify an end flip-flop and a start flip-flop of the violating path as well as all logic gates in the path. The logic gates may be numbered starting from the end flip-flop (e.g., numbered as cell0), going backwards to the start flip-flop.

The design tool 100 may insert a delay cell in the net ahead of a D-input of the end flip-flop calculated to fix the hold time violation (e.g., block 144) A check may then determine if the setup time to the end flip-flop is violated from any potential starting flip-flop (e.g., block 146). If the setup time is not violated (e.g., the NO branch of decision block 146), the path is fixed and the design tool 100 may finish the method 140 or continue with the next path in the timing report (e.g., block 148). If the inserted delay cell causes the setup time to be violated (e.g., the YES branch of decision block 146), the inserted delay cell may be removed (e.g., block 150).

A check may be performed by the design tool 100 to determine if the start flip-flop has been reached working backwards through the logic cone (e.g., decision block 152). If the start flip-flop has been reached (e.g., the YES branch of decision block 152), the design tool 100 may finish the method 140 and report the unresolved conflict to the user (e.g., block 154). If the start flip-flop has not been reached (e.g., the NO branch of decision block 152), the design tool 100 generally looks for a logic gate which is the driver of the just tried net (e.g., in the first case cell1 driving cell0, in later cases cellX driving cellX−1, etc.)(e.g., block 156). The design tool 100 generally identifies the net to an input pin of the driving cell, which is driven by a next logic gate going backwards in the cone (e.g., in the first case cell1+1, in later cases cellX+1, etc.)(e.g., block 158). A new delay cell may be inserted into the identified net (e.g., block 160) and the tool repeats the check for a setup time violation at the end flip-flop, as described above (e.g., decision block 146).

The procedure 140 of going backwards in the logic cone, finding nets, inserting a delay cell and checking timing may be automatically repeated one or more times. Repetitions may continue until either (i) the hold time violation is fixed without breaking the setup time to the end flip-flop or (ii) the start flip-flop is reached without being able to fix the hold time violation. Reaching the start flip-flop without a solution generally indicates that the timing constraints may be unrealistic such that there is an unfixable conflict between the hold time and setup time constraints. The design tool 100 may report the unfixable conflict as part of the report generated in block 154.

Figure 1:
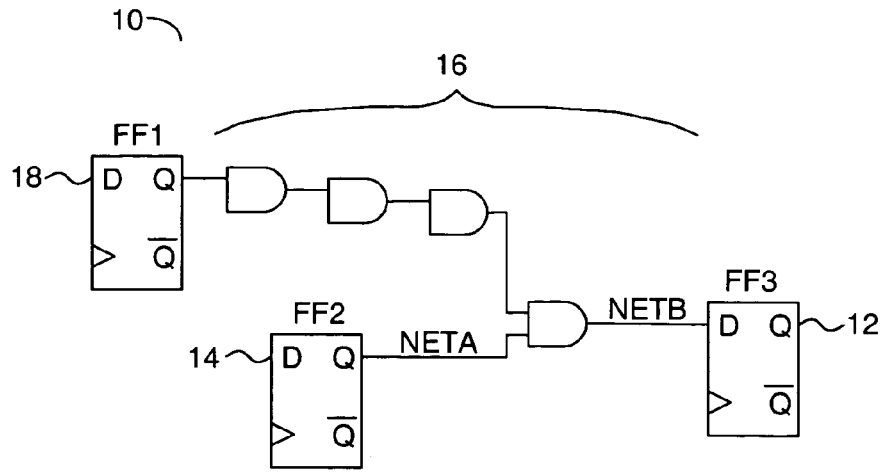
FIG. 1 is an example block diagram of a circuit illustrating a logic cone containing a common hold time violation.
Figure 4:
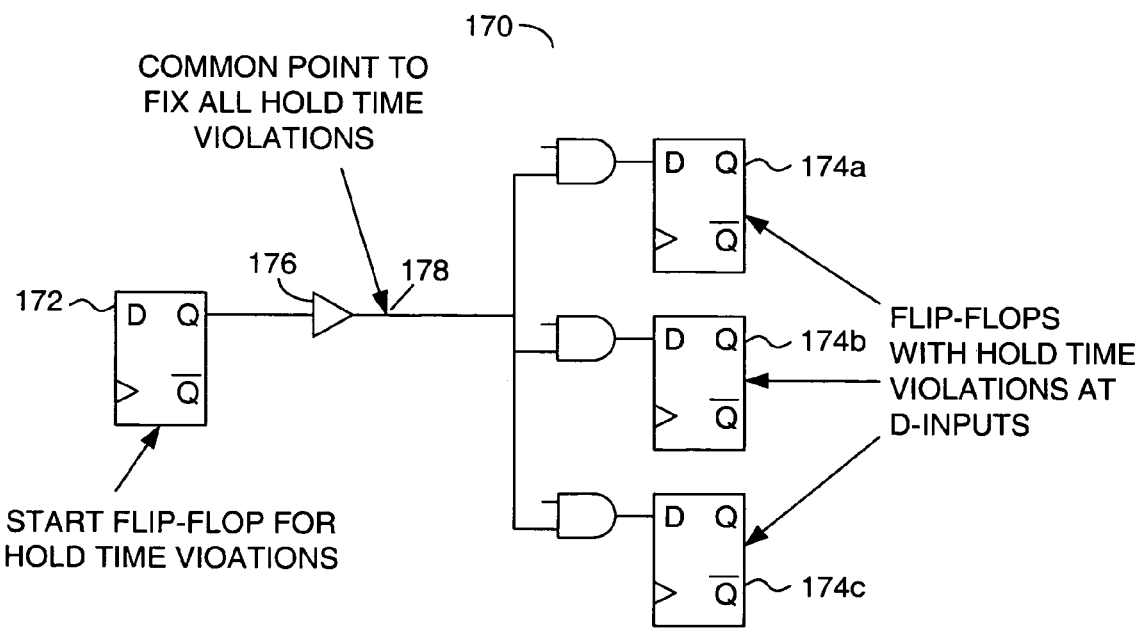
FIG. 4 is an example logic cone to illustrate a method of moving backwards through a logic cone.

Referring to FIG. 4, an example logic cone 170 is shown to illustrate the method 140 of moving backwards through a logic cone. A procedure similar to the procedure 140 described above, may be used to detect a common source (e.g., start flip-flop 172) for hold time violations at several endpoints (e.g., end flip-flops 174a-174c). Preferably, such hold time violations should be fixed by inserting a single delay cell (e.g., buffer 176) at the right point (e.g., location 178) which is common to all the violations under consideration. To be able to detect such a common point 178, the design tool 100 may work backwards through the logic as described above for method 140 for several different endpoints (e.g., end flip-flops 174a-174c) substantially simultaneously.

Referring back to FIG. 2, the reports may be generated by the design tool 100 to include one or more topics of interest to the user. For example, the reports may contain one or more types of information described as follows. Some or all nets that may have been effected directly by the ECOs in terms of new cells, deleted cells, upsized cells and/or downsized cells may be included in the reports. Some or all nets that have been effected indirectly by the ECOs may be reported along with information regarding how close the effected nets may be to violating some timing or integrity limitations. The reports may include information on the new timing caused by applying the ECOs. The new timing reports may identify all nets, paths or lines that still have a timing violation (e.g., setup time, hold time and the like).

If not all of the violations are fixed during any given run, the design tool 100 may be operational to generate one or more detailed reports identifying what violations could not be fixed. In one embodiment, the design tool 100 may be programmed to implement one or more predesignated approaches (e.g., reduce margins on non-violating paths) to correct the problems, repeat the analysis and generate a final report. The final report may include a listing of the automatic fixes, in addition to the manually generated ECOs, applied to the circuit design. The reports generally permit the effects of the manually generated ECOs to be evaluated in context with the automated violation fixes. The reports may also allow for different ECOs or sets of ECOs to be compared for a quality of the results with regards to timing and signal integrity.

An advantage of the design tool 100 may include a utilization of a complete layout database, including existing signal routing. Partial existing net routing reuse may produce accurate results immediately and thus reduce tool runtime. Different types of violations may be addressed at the same time by the design tool 100 and the effects of a potential fix for a certain violation may be taken into account when looking at the next violation immediately following in a sequence of fixes. The present invention may reduce an overall number of ECOs used to finish a design as compared with conventional approaches. In turn, the reduced number of ECOs may make project schedules more accurate compared with conventional approaches. The reports provided by the design tool 100 may allow less experienced engineers to see the effects of one or more potential ECOs before submitting a final solution for peer review.

Figure 5:
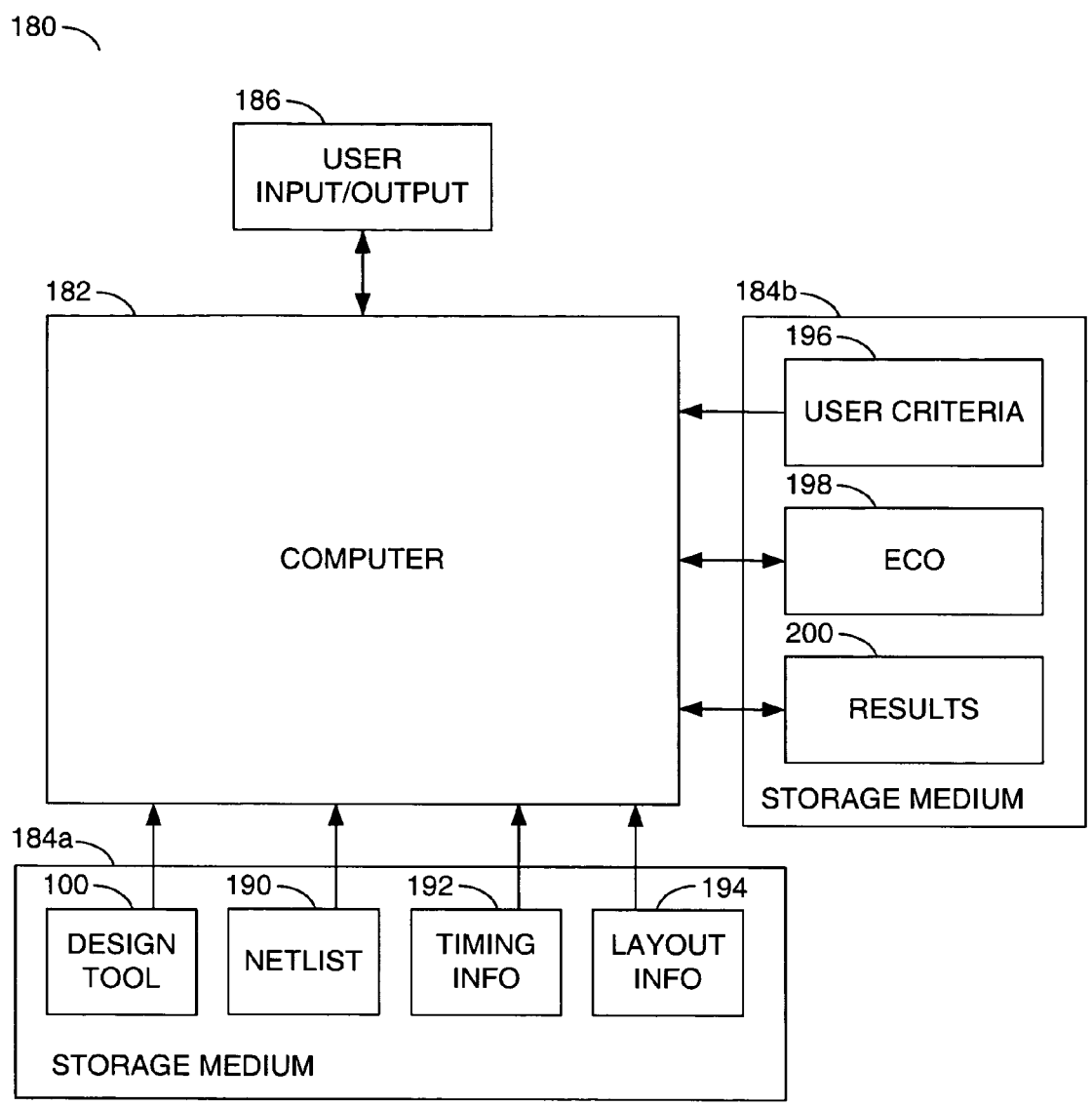
FIG. 5 is a block diagram of an example apparatus implementing an engineering change order management process.

Referring to FIG. 5, a block diagram of an example apparatus 180 implementing the ECO management process is shown. The apparatus 180 may be implemented as a computer 182, one or more storage mediums 184a-b and a user input/output 186. A storage medium 184a may store the design tool 100 (e.g., a software program), a netlist file 190, a timing information file 192 and a layout information file 194 The design tool 100 may define the steps of managing ECOs as described in FIG. 2. The file 190 may store a netlist for the circuit design used in the step 104. The file 192 may store timing information used in the step 102. The file 194 may store layout information used in the step 108.

A storage medium 184b may store a user criteria file 196, an ECO file 198 and a results file 200. The user criteria file 196 may store the violation type, priority margin and/or ECO sequence information received from the user. The ECO file 198 may store the manually generated ECO information before and/or after conversion to a predetermined format. The ECO file 198 may also store automatic ECOs generated by the design tool 100. The results file 200 may store the results of the various analysis 114.

The design tool 100 may be read and executed by the computer 182 to implement the process of analyzing the ECOs. The netlist file 190, timing information file 192 and layout information file 194 may be accessed as appropriate during execution. In one embodiment, the design tool 100, netlist files 190, timing information file 192 and layout information file 194 may be stored in the same storage medium. The user criteria file 196, the ECO file 198 and the results file 200 may be stored in the same storage medium as the design tool 100 or in another storage medium separate from that of the design tool 100. Other combinations of storage media and files may be implemented to meet the criteria of a particular application.

The function performed by the flow diagram of FIG. 2 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMS, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for managing a plurality of engineering change orders for a circuit design, comprising the steps of:
   (A) receiving said engineering change orders in a first format generated manually by a user;
   (B) analyzing said circuit design with all of said engineering change orders implemented, wherein application of said engineering change orders is prioritized based on priority information read from a criteria file as established by said user; and
   (C) generating a report of a result of said analyzing in a second format suitable for said user to read and understand, wherein (i) said report is only generated after all of said engineering change orders are implemented and (ii) step (B) comprises a sub-step of evaluating a signal integrity of each of one or more signals effected by said engineering change orders.

2. The method according to claim 1, wherein step (A) comprises the sub-step of:
   converting said engineering change orders from said first format to a third format suitable for processing by a design tool.

3. The method according to claim 1, wherein step (B) further comprises the sub-step of:
   calculating each of one or more timing changes in said circuit design caused by said engineering change orders.

4. The method according to claim 1, further comprising the step of:
   receiving a minimum timing margin from said user, said minimum timing margin corresponding to a route in said circuit design prior to implementing said engineering change orders, wherein said analyzing accounts for said minimum timing margin.

5. The method according to claim 1, wherein step (B) comprises the sub-step of:
   implementing said engineering change orders reusing existing layout information of said circuit design.

6. The method according to claim 1, wherein step (B) comprises the sub-step of:
   identifying a net within a logic cone in said circuit design that would allow correction of a timing violation that remains after implementing said engineering change orders.

7. The method according to claim 6, further comprising the step of:
   automatically implementing a change in said circuit design to correct said timing violation.

8. The method according to claim 7, wherein said change comprises a cell addition.

9. The method according to claim 7, wherein said change comprises a cell deletion.

10. The method according to claim 7, wherein said change comprises rerouting a network.

11. The method according to claim 7, wherein said change comprises changing a target margin.

12. The method according to claim 1, wherein said report comprises (i) each of one or more new cells added to said circuit design, (ii) each of one or more existing cells deleted from said circuit design, (iii) each of one or more upsized cells, (iv) each of one or more downsized cells, (v) each of one or more first nets of said circuit design within a predetermined range outside of a violation, (vi) a timing report and (vii) each of one or more second nets of said circuit design that is still violated after implementing all of said engineering change orders.

13. A method for managing a plurality of engineering change orders for a circuit design, comprising the steps of:
   (A) receiving said engineering change orders in a format generated manually by a user, said engineering change orders including (i) a first set of said engineering change orders for a first proposed change to said circuit design and (ii) a second set of said engineering change orders for a second proposed change to said circuit design;
   (B) comparing a first result generated by implementing said first proposed change with a second result generated by implementing said second proposed change; and
   (C) generating a report suitable for said user to read and understand based on said comparing said first result with said second result, wherein step (B) comprises a sub-step of evaluating a signal integrity difference for each of one or more signals common to said first result and said second result.

14. The method according to claim 13, wherein step (B) comprises the sub-step of:
   evaluating a signal timing difference for each of said signals common to said first result and said second result.

15. The method according to claim 13, wherein step (B) comprises the sub-step of:
   prioritizing application of said engineering change orders based on prioritization information (i) corresponding to a plurality of violations to be fixed and (ii) read from a criteria file as established by said user.

16. The method according to claim 13, wherein step (B) comprises the sub-step of:
   applying said engineering change orders in a sequence (i) corresponding to a plurality of violations to be fixed and (ii) read from a criteria file as established by said user.

17. The method according to claim 13, wherein step (B) comprises the sub-step of:
   automatically implementing a change in said circuit design to correct a timing violation resulting from at least one of said first proposed change and said second proposed change.

18. The method according to claim 13, wherein said report comprises (i) each of one or more new cells added to said circuit design, (ii) each of one or more existing cells deleted from said circuit design, (iii) each of one or more upsized cells, (iv) each of one or more downsized cells and (v) a timing report.

19. The method according to claim 13, wherein said report comprises each of one or more nets of said circuit design within a predetermined range outside of a violation.

20. The method according to claim 13, wherein said report comprises each of one or more nets of said circuit design that is still violated after implementing all of said engineerincg change orders.

21. A method for managing a plurality of engineering change orders for a circuit design, comprising the steps of:
   (A) receiving said engineering change orders in a format generated manually by a user;
   (B) analyzing said circuit design with all of said engineering change orders implemented, wherein application of said engineering change orders is according to a sequence read from a criteria file as established by said user; and
   (C) generating a report suitable for said user to understand based on a result of said analyzing, wherein (i) said report is only generated after all of said engineering chance orders are implemented, (ii) said report comprises each of one or more first nets of said circuit design within a predetermined range outside of a violation and (iii) step (B) comprises a sub-step of evaluating a signal integrity of each of one or more signals effected by said engineering change orders.

22. The method according to claim 21, wherein said report further comprises (i) each of one or more new cells added to said circuit design, (ii) each of one or more existing cells deleted from said circuit design, (iii) each of one or more upsized cells, (iv) each of one or more downsized cells and (v) a timing report.

23. The method according to claim 21, wherein said report further comprises each of one or more second nets of said circuit design that is still violated after implementing all of said engineering change orders.

* * * * *